United States Patent
Stoakes (10) Patent No.: US 8,892,526 B2
(45) Date of Patent: Nov. 18, 2014

(54) DEDUPLICATION SEEDING

(76) Inventor: Timothy Stoakes, Humburg Scrub (AU)

(*) Notice: Subject to any disclaimer, the term of this patent is extended or adjusted under 35 U.S.C. 154(b) by 0 days.

(21) Appl. No.: 13/348,031

(22) Filed: Jan. 11, 2012

(65) Prior Publication Data

US 2013/0179407 A1 Jul. 11, 2013

(51) Int. Cl.
*G06F 17/30* (2006.01)

(52) U.S. Cl.
USPC ............ 707/692; 707/812; 707/814; 711/162

(58) Field of Classification Search
CPC .............. G06F 17/30067; G06F 17/30489; G06F 12/0253; G06F 12/0261
USPC ......... 707/616, 664, 687, 692, 741, 746, 747, 707/820, 999.002, 626, 812, 813, 814; 711/162, 170; 714/6.12
See application file for complete search history.

(56) References Cited

U.S. PATENT DOCUMENTS

| 6,188,976 | B1* | 2/2001 | Ramaswamy et al. | 704/9 |
|---|---|---|---|---|
| 8,190,850 | B1* | 5/2012 | Davenport et al. | 711/202 |
| 8,280,860 | B2* | 10/2012 | Spackman et al. | 707/692 |
| 2008/0184001 | A1* | 7/2008 | Stager | 711/167 |
| 2009/0313248 | A1* | 12/2009 | Balachandran et al. | 707/6 |
| 2011/0161291 | A1* | 6/2011 | Taleck et al. | 707/622 |
| 2011/0270883 | A1* | 11/2011 | Bukai et al. | 707/777 |

* cited by examiner

*Primary Examiner* — Greta Robinson (57) ABSTRACT

Apparatus, methods, and other embodiments associated with de-duplication seeding are described. One example method includes re-configuring a data de-duplication repository with a blocklet from a data de-duplication seed corpus. Reconfiguring the repository may include adding a blocklet from the seed corpus to the repository, activating a blocklet identified with the seed corpus in the repository, removing a blocklet from the repository, and de-activating a blocklet in the repository. The example method may also include re-configuring a data de-duplication index associated with the data de-duplication repository with information about the blocklet. Reconfiguring the repository and the index increases the likelihood that a blocklet ingested by a data de-duplication apparatus that relies on the repository and the index will be treated as a duplicate blocklet by the data de-duplication apparatus.

6 Claims, 6 Drawing Sheets

DEDUPLICATION SEEDING

BACKGROUND

Data de-duplication systems generally include a repository of unique blocklets, an index or indexes for accessing the repository of unique blocklets, and representations of items made up from the unique blocklets. Data de-duplication systems also generally include processes for ingesting received data and for determining whether the ingested data includes new unique blocklets and/or duplicate (e.g., already stored) blocklets. If the ingested data is not found in the repository, then the ingested data may be added to the repository and the index may be updated with information about the ingested data that was added to the repository. If the ingested data is found in the repository, then a reference to the copy of the data may be used to refer to the data and the ingested data may be discarded. Naturally, when a system is just put into use, practically all data ingested will be new data and little, if any, de-duplication will occur. While data ingestion is described, similar issues arise in a replication environment where data from a first location or device is being replicated at a second location or device.

During ingest, data de-duplication systems typically parse larger blocks of data into smaller blocklets of data and then populate the repository with unique blocklets and populate the index(es) used to access the repository with information about the unique blocklets. In some conventional systems, parsing larger blocks into smaller blocklets may include finding blocklet boundaries using a rolling hash and making duplicate determinations for every parsed blocklet. The duplicate determination may include producing an identifier (e.g., fingerprint) for a blocklet. The identifier may be, for example, a blocklet-wide hash (e.g., MD5 (Message Digest Algorithm 5)). Parsing a block into blocklets and then fingerprinting the blocklets using, for example, the MD5 hash, facilitates storing unique blocklets and not storing duplicate blocklets. Instead of storing duplicate blocklets, smaller representations of stored blocklets can be stored in file representations, object representations, and other data representations. When a system is new or relatively immature, practically every piece of data will be treated as a unique blocklet.

Conventional de-duplication systems already achieve significant reductions in the storage footprint of data, including pattern data, by storing just the unique blocklets and storing the smaller representations of duplicate blocklets. However, these significant reductions may only occur after a break-in period where the repository of duplicate blocks is built up. In addition to reducing the storage footprint for data, de-duplication systems may also be used to reduce the amount of data that is transmitted between devices (e.g., computers). De-duplication systems may be used to reduce data traffic to just unique data and information about that unique data. Conventional de-duplication systems already achieve significant reductions in the transmission footprint of data by making it possible to transmit only unique data from one location to another location.

One issue may arise because conventional data de-duplication systems may all "start from scratch". Thus, both the index and/or the repository may initially be empty. As opposed to being "empty", a repository and index may be in a sub-optimal state when a repository is immature, when data being stored or transmitted is significantly different than the data that has been previously processed, when the working set of data being processed is too large for the system to handle effectively and thus 'older' data becomes more expensive or impossible to de-duplicate against, or for other reasons. When an index has less than complete knowledge of the blocklets in the repository, then using the index may be very expensive with little, if any, return on the investment. Similarly, when a repository has few relevant unique blocklets, then looking for duplicate blocklets in the repository may also be very expensive with little return on the investment.

Whether being used to reduce the amount of data stored or to reduce the amount of data transmitted, de-duplication may be relatively ineffective and even counter-productive until a relevant reference pool is built up in the repository or repositories and until knowledge about the relevant reference pool is acquired and made accessible. Unfortunately, filling a repository to a useful level may be expensive in terms of bits transmitted across a network, processor time spent analyzing blocklets, processor time spent populating an index, and other actions. Thus it may be a difficult decision to add data de-duplication to a computing environment. Compounding the difficulty of the decision making is the fact that different systems and different applications may have different break-even points and costs. For example, a de-duplication system that includes a repository in "the cloud" may be characterized by a high latency link to the repository, billable or expensive processor time, and billable or expensive memory usage, and thus may have a first break-even point determined by these characterizations. In another example, a de-duplication system that has extensive storage optimized for the repository may be characterized by a low latency link to the repository, non-billable or very inexpensive processor time, and non-billable or very inexpensive memory. Thus it may be difficult to predict when, if ever, a break-even point will be reached. All of these issues present barriers to entry for adopting data de-duplication systems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods prepare a de-duplication repository and/or index with blocklets and/or information about the blocklets that mitigate issues associated with a sparse, immature, or otherwise ill-prepared repository and/or index. Example systems and methods facilitate preparing a de-duplication system to be ready to process a certain type of data and/or a certain body of data. Thus, instead of starting from scratch where nearly every blocklet will be deemed to be a unique blocklet, a de-duplication repository can be seeded with blocklets that may be more relevant and that can allow even a first instance of a data stream to achieve some useful de-duplication. Preparing the repository and/or the index facilitates achieving a higher de-duplication ratio where a higher percent of ingested data is covered by unique blocklets in the repository and for which information resides in a relevant index. Preparing the repository and/or index may be referred to as "seeding" the system with a seed corpus.

In one example, a seed corpus can be considered to be a collection of data that when present in a de-duplication system before ingest of data related to the seed corpus will result in improved de-duplication processing of the related data when it is ingested. A seed corpus may include a set of blocklets. The blocklets may be blocklets that were produced during data de-duplication. In one embodiment, the blocklets may also be "fabrication" blocklets that were not produced during data de-duplication but were produced to support de-duplication. An example fabrication blocklet is a blocklet that contains a fabricator selected collection of values (e.g., all space characters, all zeroes). In one embodiment, multiple seed corpora may be available for seeding a system and thus selection of an appropriate corpus may be made. A selection goal may be, for example, to select the smallest possible effective seed for a given corpus. While every data stream is different, many data streams share similarities. Thus, blocklets that are known to be common blocklets can be placed into a repository of blocklets before any data is ingested by a data de-duplication system. Additionally, some special blocklets (e.g., pattern blocklets) can also be seeded into a repository of blocklets to prevent having to discover these special blocklets in each new system. For example, packets that have all zeroes or all ones or all space characters or other known patterns can be placed into a seed corpus for seeding a system. Thus, the system will not have to discover the fact that a certain blocklet that stores patterns of pad or buffer characters is common, the blocklet will be pre-placed in the repository of blocklets.

Different seed corpora may be available to seed a data de-duplication system. Seeding a data de-duplication system is possible because even though different data streams being ingested may have differences, different data streams may also have similarities. Consider that an enterprise may, at different times, ingest several different types of data streams to be de-duplicated. For example, one ingest may deal primarily with backing up data for a first application used by the enterprise (e.g., word processing) while a second ingest may deal primarily with backing up data for a second application used by the enterprise (e.g., video editing). It is possible, even likely, that different sets of unique blocklets will be more important for achieving a high de-duplication rate for the different data streams.

The data streams may differ based on other criteria. Consider the type of data that is transmitted across a network on the day of the Super Bowl, on the day of a presidential election, on the opening day of Fashion Week in New York City, and on the biggest shopping day of the year. Once again it is possible, even likely, that different sets of unique blocklets will be more important for achieving a high de-duplication rate for the different data streams. In this second example, the differences may not be due to the type of applications being performed, but may be more dependent on a pre-defined event occurring (e.g., sports event, political event). Consider a third example where the data stream may be related to the locations of the users. If one set of users are located in Sydney, Adelaide, and Perth while a second set of users are located in Paris, Nice, and Lyon and a third set of users are located in Tokyo and Kyoto, then once again different sets of unique blocklets will be more important for achieving a high de-duplication rate for the different streams.

Thus, example systems and methods may initially be configured with seed corpora that are relevant to the data expected to be encountered during de-duplication. Therefore, rather than starting from scratch, the systems and methods will have a head start that will mitigate the issues associated with building up a relevant repository. Example systems and methods may also be supplied with different seed corpora over time as the needs of the users change and/or become better understood. The data streams and associated seed corpora may be identifiable based on other factors including, but not limited to, day of the week (e.g., Monday, Tuesday, Wednesday), day of the year (e.g., first day, second day), pre-defined business event day (e.g., day before a sale, day of a sale, day after a sale, first day of business quarter, last day of business quarter), pre-defined political event day (e.g., day before election, day of an election, day after an election), pre-defined sporting day (e.g., first match of Rugby World cup, final match of Rugby World Cup, first day of Olympics, last day of Olympics), application associated with data stream (e.g., word processor, spreadsheet, video editor, sound editor, database), and user attributes associated with data stream (e.g., geographic location, language spoken, typical work hours).

The final example in the above list provides an interesting illustration of how different seed corpora could be built up over time for an organization and then used periodically (e.g., daily, weekly, monthly, quarterly, annually) to manipulate the repository and/or index to achieve higher de-duplication rates. By way of illustration, an enterprise like a financial house may have different sets of workers that perform different sets of work at different times of the day, week, quarter, or year. For example, a first set of workers may prepare investors and traders for the trading day by providing research, a second set of workers may support investors and traders during the trading day by providing real-time quotes and news, and a third set of workers may reconcile the business performed during the day after trading closes. Initially the de-duplication system for the enterprise may have been empty or may have been seeded with a financial house seed corpus. Over time, by analyzing the data de-duplication rate for the financial house in light of different data streams, different unique blocklets may have been identified as being more useful at different times of the day. Thus, different time-of-day seed corpora may have been generated by observing the data streams and their de-duplication rates.

The "repository" includes a physical collection of unique blocklets. The "index" includes information for locating a unique blocklet in the repository. In different embodiments the repository may take on organizations including, but not limited to, a single data structure stored on a single physical device, a single data structure stored on multiple physical devices, multiple data structures stored on a single physical device, multiple data structures stored on multiple physical devices, or other organizations. In different embodiments the index may also take on organizations including, but not limited to, a single data structure stored on a single physical device, a single data structure stored on multiple physical devices, multiple data structures stored on a single physical device, multiple data structures stored on multiple physical devices, or other organizations.

Over time, both the repository and the index may grow to be extremely large. Thus, a collection and/or hierarchy of storage locations may be employed to store the repository and the index. For example, blocklets and/or index data may be stored in memory, on a solid state drive, on a disk, on tape, in a tape library, and in other locations. Different devices may have different access times. Thus, in one example, different seed corpora may be accessed to facilitate manipulating where different portions of the repository or index are stored. The different portions may be related to the data stream being ingested.

Thus, not only can a seed corpus be used to mitigate the initial buildup of a useful repository, but in one example a seed corpus may be used to enhance de-duplication performance by controlling on which devices blocklets and/or index information is stored. By way of illustration, when the data stream is associated with English speaking stock brokers, a first seed corpus may be used to manipulate the repository and index and may also be used to manipulate where certain blocklets and index information are stored. For example, a relevant subset of all the available unique blocklets may be moved from a slower device (e.g., tape) to a faster device (e.g., memory) and a less relevant subset may be moved from the faster device to a slower device. Then, when the de-duplication system becomes aware that the data stream is associated with Japanese speaking researchers, a different subset of the available unique blocklets may be moved to the faster device(s) and the blocklets currently residing on the device may be evicted back to the slower device(s). Thus, the initial build up issue may be mitigated not just when a repository or index is void of information because the system has just been turned on and hasn't been populated, but also when a repository or index has moved what may be the most relevant information at this point in time to a slower device. When the relevant data resides on a slower device a system could be making duplicate determinations using irrelevant data located in faster devices while the relevant data languishes in slower devices. Over time, the relevant data may be brought into the faster devices using other mechanisms (e.g., temporal locality, spatial locality). However, in one example a seed corpus can be used to control and improve the transfer of relevant information and irrelevant information between devices with different access times.

Example systems and methods may determine and/or maintain an appropriate seed corpus based on different criteria. For example, blocklets for a seed corpus may be selected from a mature repository that has ingested a representative sample of a relevant type of data. In one example, blocklets may be selected from the repository based, for example, on whether their reference count is above a threshold, or whether they are in the top percentages of the referenced blocklets. In another example, blocklets may be selected based on properties of actual data that identify whether a blocklet is likely to match generically in the future or whether the blocklet is going to be specific to an individual deployment. By way of illustration, blocklets that contain time-insensitive and situation-insensitive data (e.g., an entire blocklet of a single character) are more likely to be included in a seed corpus while blocklets that contain time-sensitive or situation-sensitive data (e.g., timestamps, local file paths) are less likely to be included in a seed corpus. By way of further illustration, blocklets may be selected randomly or by trial and error and then useful blocklets selected.

Some seed corpora may be identified by a de-duplication provider. This type of seed corpus may be pre-installed by the provider. Other seed corpora may be identified by a de-duplication user. This type of seed corpus may be installed by a user. By way of illustration, a de-duplication provider may have a seed corpus available for users in a certain industry who are likely to reference a known body of work. For example, computer scientists may be expected to reference work from the Association of Computing Machinery (ACM), from the Institute of Electrical and Electronic Engineers (IEEE) and from other industry groups. Thus, blocklets that have been formed from materials available from these organizations may be provided in a "Computer Science" seed corpus. In another example, tax accountants may be expected to reference work from the tax codes of various countries. Thus, blocklets that have been formed from materials used by tax accountants may be provided as a "Tax Accountant" seed corpus. While industry seed corpora are described, other types of seed corpora may be provided. Also, while vendor installed seed corpora and user installed seed corpora are described, a seed corpus may also be available for download and may be customized over time by the vendor or user.

Seed corpora may be established individually, may be grouped together, or may be arranged in hierarchies. For example, an enterprise (e.g., University) may have seed corpora arranged in a hierarchy, with successively lower layers being organized by school and then department. Additionally, there may be different hierarchies available for different situations at the University. For example, a first hierarchy may be available for admissions considerations, a second hierarchy may be available for testing purposes, and a third hierarchy may be available for research.

With multiple seed corpora available for use, how a seed corpus or combination of seed corpora is chosen may positively impact performance of a seeded system. Different approaches to selecting a seed corpus can include, but are not limited to, manual choices, scripted choices, calendar-based choices, event-driven choices, historical performance based choices, on-the-fly adaptive choices, and others. With multiple seed corpora available, and with the ability to select a seed corpus for use, timely selection of an appropriate seed corpus may also positively impact performance of a seeded system. Conversely, choosing an appropriate seed corpus at an inappropriate time may have undesirable consequences. A seed corpus may be selected at times determined as a function of a manual choice, a calendar based choice, detecting changes in an incoming data stream, and of other triggers.

Once a seed corpus has been selected, a repository and/or an index associated with the repository may be manipulated. The manipulations can include, for example, moving blocklets out of a repository to make room for the seed blocklets and/or moving seed blocklets into a repository, moving blocklets from a slower device (e.g., tape) to a faster device (e.g., disk) or to an even faster device (e.g., SSD, memory), moving index information from a first device (e.g., disk) to a second device (e.g., memory), moving index information into a cache (e.g., temporal cache, proximity cache), and other actions. With the repository and/or index manipulated, data ingest may proceed. While the ingest "proceeding" is described, one skilled in the art will appreciate that in one embodiment, seed corpus selection may occur while ingest is ongoing. Thus, in different examples, ingest may not wait for seeding to finish. If an appropriate seed corpus has been selected, then ingest may produce a higher de-duplication rate where a greater percentage of ingested blocklets are found in the repository and thus de-duplicated out of the ingest stream. Similarly, while "ingest" is described, moving blocklets and moving index information may be associated with a replication event where data from one system and/or location is replicated at another system and/or location. In this case, seed corpus selection may occur while replication is ongoing.

The following includes definitions of selected terms employed herein. The definitions include various examples and/or forms of components that fall within the scope of a term and that may be used for implementation. The examples are not intended to be limiting. Both singular and plural forms of terms may be within the definitions.

ASIC: application specific integrated circuit.
CD: compact disk.
CD-R: CD recordable.
CD-RW: CD rewriteable.
DVD: digital versatile disk and/or digital video disk.
I/O: input/output
LAN: local area network.
PCI: peripheral component interconnect.
PCIE: PCI express.
RAM: random access memory.
DRAM: dynamic RAM.
SRAM: synchronous RAM.
SSD: solid state drive.
ROM: read only memory.
PROM: programmable ROM.
USB: universal serial bus.
WAN: wide area network.
PPP: Point-to-Point protocol References to "one embodiment", "an embodiment", "one example", "an example", and other "examples", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and other types of disks. Volatile media may include, for example, semiconductor memories, dynamic memory, and other types of memory. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other location where data can be stored. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and other types of circuits or devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and other types of signals and instructions, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or other circuit or process. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
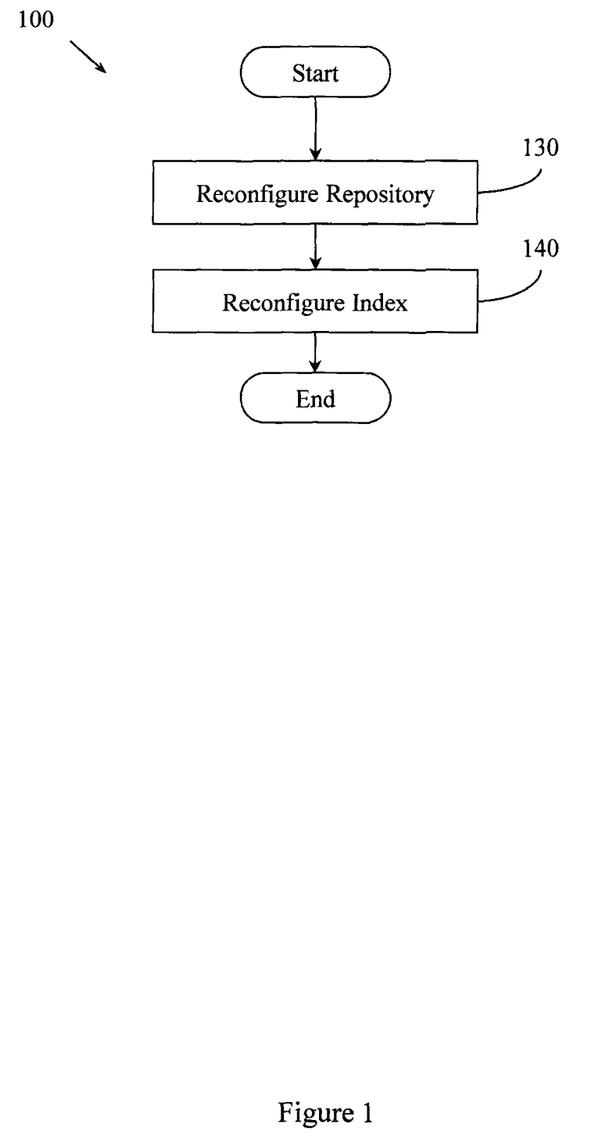
FIG. 1 illustrates an example method associated with de-duplication seeding.

FIG. 1 illustrates a method 100 associated with de-duplication seeding. Method 100 may include, at 130, re-configuring a data de-duplication repository with a first blocklet taken from a source other than a data stream being ingested. The source may be, for example, a seed corpus. In one example, re-configuring the repository includes moving the first blocklet from the seed corpus into the repository. Moving the first blocklet may include physically copying the blocklet from one location to another, copying a pointer to the blocklet from one location to another location, copying a reference to the blocklet from one location to another location, and other actions. In another example, re-configuring the repository may include activating the first blocklet in the repository. Activating the first blocklet may include, for example, manipulating cache data, moving the blocklet from a relatively slower device (e.g., tape) to a relatively faster device (e.g., solid state drive), moving index information from a relatively slower device (e.g., disk) to a relatively faster device (e.g., memory), setting a bit in a filter, and other actions. In one example, the repository may be re-configured before data is ingested. In another example, the repository may be re-configured while data is being ingested. The repository may be re-configured with data that was previously ingested or may be re-configured with a blocklet that was artificially created. An artificially created blocklet may be, for example, a pattern blocklet, a blocklet from a notoriously well-known work, or other fabrication.

Method 100 may also include, at 140, re-configuring a data de-duplication index associated with the data de-duplication repository. The index will be re-configured with index information about the first blocklet. The information may include, for example, location information for the first blocklet. In one example, reconfiguring the index includes moving information about the first blocklet into the index. Moving information into the index may include physically copying the information itself, copying a pointer to the information, copying a reference to the information, or other actions. In another example, reconfiguring the index may include activating information about the first blocklet in the index. Activating information about the first blocklet may include, for example, manipulating cache data, moving index information from a relatively slower device (e.g., disk) to a relatively faster device (e.g., memory), and other actions.

Reconfiguring the data de-duplication repository at 130 or reconfiguring the data de-duplication index at 140 will increase the likelihood that blocklets being processed by a data de-duplication apparatus will be treated as duplicated by a data de-duplication apparatus using the data de-duplication repository and the data de-duplication index. Processing the blocklets may include parsing the blocklets out of a data stream being ingested by the data de-duplication apparatus using the data de-duplication repository and the data-duplication index. Processing the blocklets may also include handling the blocklets as part of a replication process.

While FIG. 1 illustrates various actions occurring in serial, it is to be appreciated that various actions illustrated in FIG. 1 could occur substantially in parallel. By way of illustration, a first process could reconfigure a repository and a second process could reconfigure an index. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a non-transitory computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
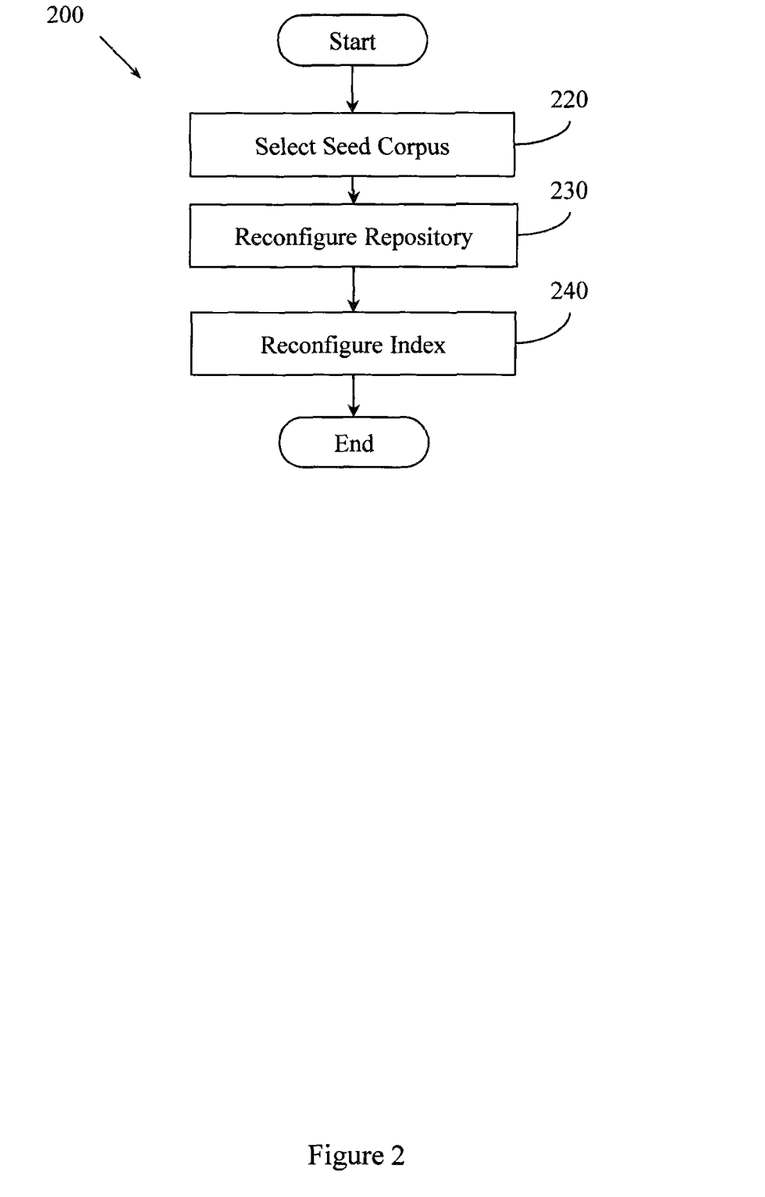
FIG. 2 illustrates an example method associated with de-duplication seeding.

FIG. 2 illustrates a method 200 associated with de-duplication seeding. Method 200 includes actions similar to those described in connection with method 100 (FIG. 1). For example, method 200 includes reconfiguring a repository at 230 and reconfiguring an index at 240. However, method 200 may also include additional and different actions.

For example, method 200 includes, at 220, selecting the seed corpus from two or more available seed corpora. In different examples, the seed corpus may be selected as a function of items including, but not limited to, a relationship between data to be ingested by the data de-duplication apparatus and the seed corpus, a historical performance measurement associated with the seed corpus, an on-the-fly performance measurement associated with the seed corpus, a user action, a calendar date, a day of the week, a time of day, a user identity, and an occurrence of a pre-defined event. The historical performance measurement and the on-the-fly performance measurement may describe, for example, a data de-duplication rate achieved while ingesting a data stream.

Figure 3:
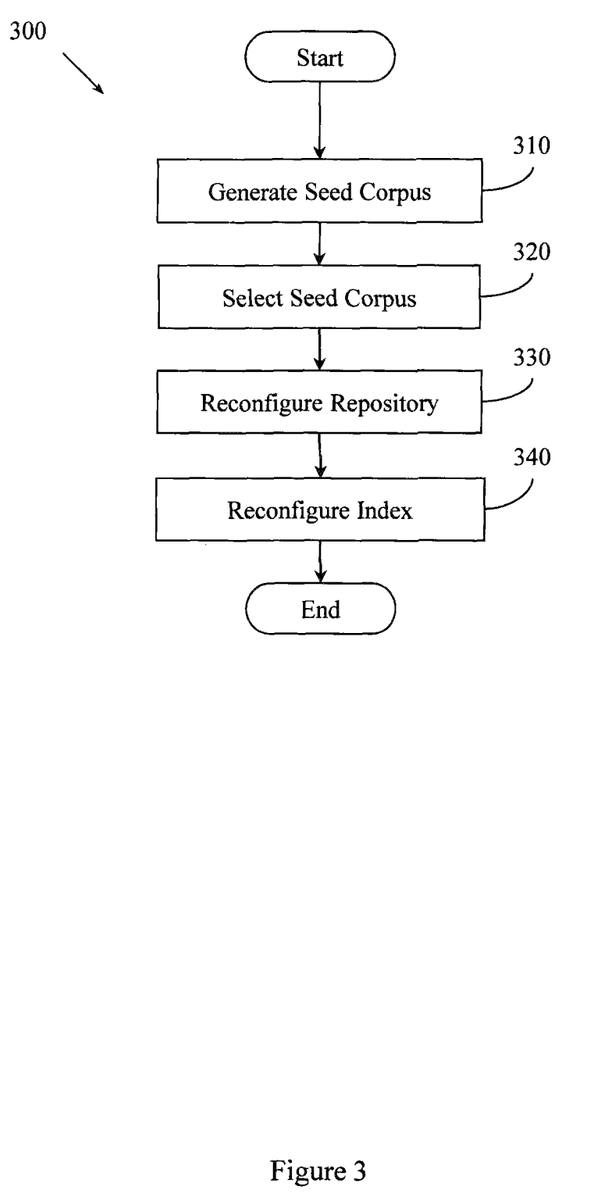
FIG. 3 illustrates an example method associated with de-duplication seeding.

FIG. 3 illustrates a method 300 associated with de-duplication seeding. Method 300 includes actions similar to those described in connection with method 100 (FIG. 1) and method 200 (FIG. 2). For example, method 300 includes selecting a seed corpus at 320, reconfiguring a repository at 330 and reconfiguring an index at 340. However, method 300 may also include additional and different actions.

For example, method 300 may also include, at 310, generating a new seed corpus. In different examples generating the new seed corpus can include selecting a seed blocklet from an existing repository or fabricating a blocklet without ingesting data. A blocklet can be selected based on items including, but not limited to, a reference count associated with the seed blocklet, an attribute describing the generalness of the seed blocklet, a trial and error approach, and a random approach. The reference count may describe how many times the blocklet was encountered in a data stream. Thus, a higher reference count may indicate a common and potentially more valuable blocklet while a lower reference count may indicate an uncommon and potentially less valuable blocklet.

Methods 100, 200, and 300 may be used at different times under different circumstances. In one example, establishing a new installation with a new customer may involve selecting a seed corpus available at the vendor and pre-populating the repository and index with blocklets and information from the selected seed corpus. In another example, establishing a new installation with an existing customer that has other installations may involve selecting a seed corpus available at the customer and pre-populating the repository and the index with blocklets and information from the selected seed corpus. In another example, an existing installation at an existing customer may use one of the methods to switch between relevant data sets. By way of illustration, the existing installation may have different seed corpora for different days of the week. Therefore a seed corpus may be selected based on the day of the week. In another example, an existing installation at an existing customer may be re-tasked to deal with new applications or data streams. By way of illustration, an industry may migrate from one purpose (e.g., email serving) to another purpose (e.g., video serving) and thus may be starting over with respect to having a relevant or useful set of blocklets indexed and in the repository. Rather than starting from scratch, an appropriate seed corpus may be selected to provide the enterprise with a head start towards a relevant and useful reference data set in the repository.

Figure 4:
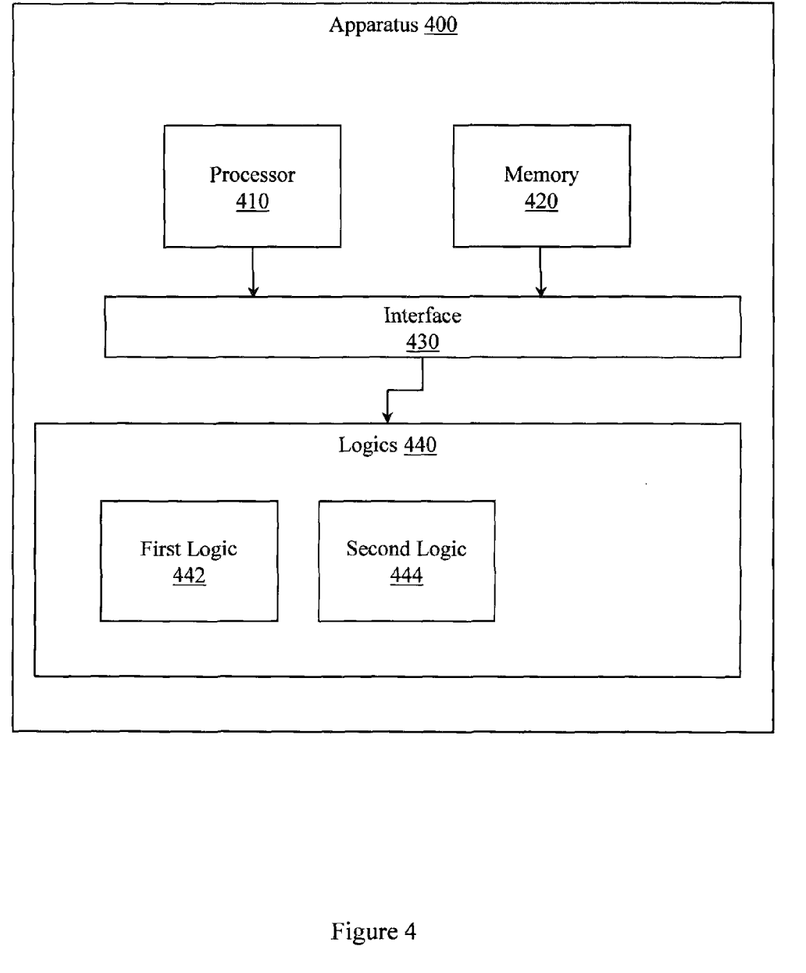
FIG. 4 illustrates an example apparatus associated with de-duplication seeding.

FIG. 4 illustrates an apparatus 400 for performing de-duplication seeding. Apparatus 400 includes a processor 410, a memory 420, a set 440 of logics, and an interface 430 to connect the processor 410, the memory 420, and the set 440 of logics. The set 440 of logics is configured to manipulate a repository of blocklets and to manipulate an index to the repository of blocklets with information about a new blocklet(s) used to manipulate the repository. In one embodiment, all, none, or portions of the repository may reside in memory 420 and all, none, or portions of the index may reside in memory 420. The set 440 of logics manipulates the repository and the index to change the likelihood that blocklets parsed out of a data stream being processed (e.g., ingested) by the data de-duplication apparatus 400 will be treated as a duplicate blocklet. In one embodiment, apparatus 400 may be a special purpose computer that is created as a result of programming a general purpose computer. In another embodiment, apparatus 400 may include special purpose circuits that are added to a general purpose computer to produce a special purpose computer.

In one embodiment, the set 440 of logics includes a first logic 442 and a second logic 444. In one embodiment, the first logic 442 is configured to manipulate a data de-duplication repository used by the data de-duplication apparatus 400 to make duplicate blocklet determinations. The first logic 442 manipulates the data de-duplication repository with a first blocklet associated with a seed corpus. In one example, the first logic 442 manipulates the repository by adding the first blocklet from the seed corpus to the repository. In another example, the first logic 442 manipulates the repository by moving the first blocklet from a first storage device having a first (e.g., slower) access time to a second storage device having a second (e.g., faster) access time. To improve performance, the blocklet may be moved from the slower device to the faster device. Since devices have finite space, in one embodiment the first logic 442 may be configured to remove a selected blocklet from the repository and to replace the selected blocklet with the first blocklet.

In different embodiments or at different times the first logic 442 may manipulate the repository using a seed corpus that was provided at the time of the initial configuration of the data de-duplication apparatus 400, a seed corpus that was provided after the time of the initial configuration of the data de-duplication apparatus 400, or at other times. Different seed corpora may be associated with different dates, events, users, topics, languages, locations, and other properties that may affect the contents of a data stream.

In different embodiments or at different times the first logic 442 may be configured to manipulate the repository using a seed corpus that is part of a hierarchy of seed corpora, of a grouping of seed corpora, or of other collections of seed corpora.

In one embodiment, the second logic 444 is configured to manipulate a data de-duplication index with information about the first blocklet. Like the repository, the data de-duplication apparatus 400 uses the data de-duplication index to make duplicate determinations. A duplicate determination identifies whether a blocklet parsed out of a data stream already exists in the repository or at a replication location. The duplicate determination may involve hashing the parsed out blocklet and looking in the index to see whether there is an entry in the index for the blocklet. If there is an entry, then the data de-duplication index may be used to locate a block stored in the repository. In one embodiment, manipulating the index may include adding information about the first blocklet to the index. The information added may include, for example, location information for the first blocklet, identifier information for the first blocklet, and other information. While "the index" is described, one skilled in the art will appreciate that a de-duplication index may include multiple data structures stored in multiple locations. For example, an index may include portions stored in cache memory, portions stored in random access memory, portions stored on a solid state device (SSD), and portions stored on a disk.

Figure 5:
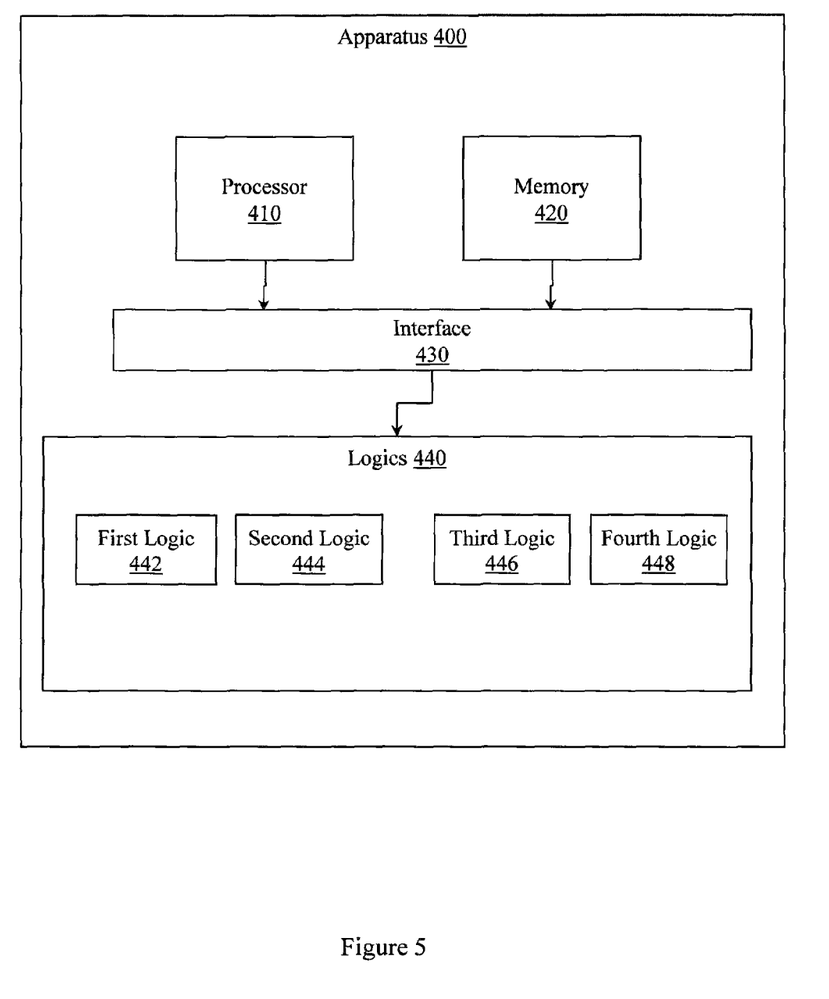
FIG. 5 illustrates an example apparatus associated with de-duplication seeding.

FIG. 5 illustrates another embodiment of apparatus 400. This embodiment includes a third logic 446 and a fourth logic 448. In one embodiment, third logic 446 is configured to select the seed corpus from two or more available seed corpora. The seed corpora may include data associated with items including, but not limited to, a generic seed corpus, a company specific seed corpus, a user specific seed corpus, a topic specific seed corpus, a language specific seed corpus, a calendar day specific seed corpus, a day of the week specific seed corpus, a pre-defined event seed corpus, a type of backup seed corpus, and a random seed corpus. The third logic 446 can select a seed corpus based on different criteria. The third logic 446 may also select a seed corpus at different times based on different criteria. For example, the third logic 446 can select the seed corpus based on a characteristic(s) of data to be processed (e.g., ingested, replicated) by the data de-duplication apparatus 400.

In one embodiment, fourth logic 448 is configured to produce a new seed corpus. The new seed corpus may be generated based on observations of data streams that are ingested and unique blocklets and index information that enhances the de-duplication ratio for a data stream. The fourth logic 448 may generate the new seed corpus by, for example, selecting a blocklet for the seed corpus from an existing repository as a function of a reference count associated with a blocklet in the repository, selecting a blocklet for the seed corpus from an existing repository as a function of how likely the blocklet in the existing repository is to produce a generic match in a data stream to be ingested by the data de-duplication apparatus 400, selecting a blocklet for the seed corpus from an existing repository using a random approach, or other approaches.

Figure 6:
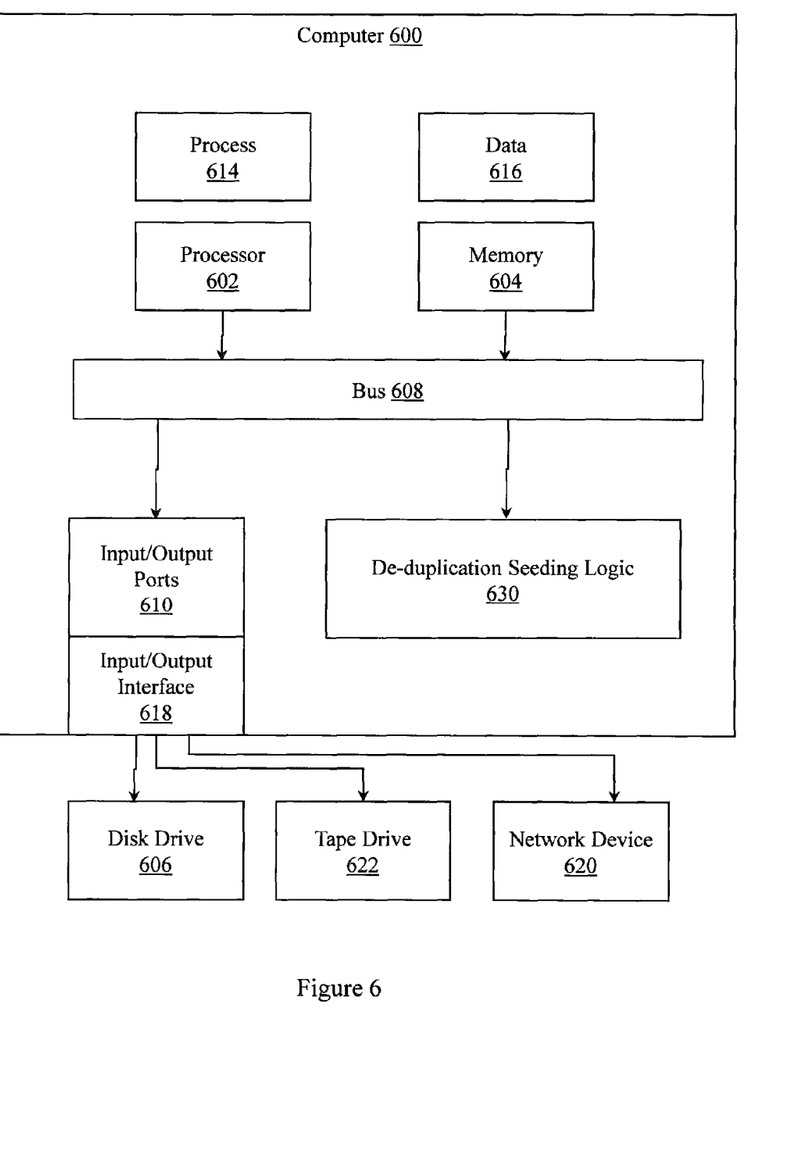
FIG. 6 illustrates an example computing environment in which example apparatus, systems, methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a de-duplication seeding logic 630 configured to facilitate improving a de-duplication ratio by manipulating a set of blocklets used in making duplicate determinations and index information used for accessing the set of blocklets. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for identifying a property of a data stream being processed (e.g., ingested, replicated) by a data de-duplication apparatus. The property may be, for example, a language, a source location, a source user, a source topic, or other properties. Logic 630 may also provide means (e.g., hardware, software, firmware) for updating a data de-duplication repository of unique blocks in use by the data de-duplication apparatus with data from a data de-duplication seed corpus. The data from the data de-duplication seed corpus is configured to increase a de-duplication rate for a data stream being processed (e.g., ingested, replicated). The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory and/or non-volatile memory. Non-volatile memory may include, for example, ROM, PROM, and other types of memory. Volatile memory may include, for example, RAM, SRAM, DRAM, and other types of memory.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, or other type of drive. Furthermore, the disk 606 may be a CD-ROM drive, a CD-R drive, a CD-RW drive, a DVD ROM drive, a Blu-Ray drive, an HD-DVD drive, or other type of drive. The memory 604 may store a process 614 and/or a data 616, for example. The disk 606 and/or the memory 604 may store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and other devices. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, AABB, AABBC, and AABBCC (e.g., the data store may store only A, only B, only C, A&B, A&C, B&C, A&B&C, A&A&A, A&A&B, A&A&B&B, A&A&B&B&C, A&A&B&B&C&C). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. A non-transitory computer-readable medium storing computer-executable instructions that when executed by a computer cause the computer to perform a data de-duplication method, the method comprising:
   re-configuring a data de-duplication repository with a first blocklet taken from a source other than a data stream being ingested by a data de-duplication apparatus, where the source other than the data stream being ingested is a seed corpus, and where re-configuring the repository comprises moving the first blocklet from the seed corpus into the repository;
   re-configuring a data de-duplication index associated with the data de-duplication repository with index information about the first blocklet,
   where reconfiguring the data de-duplication repository or the data de-duplication index increases the likelihood that a second blocklet will be treated as a duplicate blocklet when processed by the data de-duplication apparatus using the data de-duplication repository and the data-duplication index to support duplicate blocklet determinations, and generating a new seed corpus, where generating the new seed corpus comprises selecting a seed blocklet from an existing repository based, at least in part, on one or more of, a reference count associated with the seed blocklet, an attribute describing the generalness of the seed blocklet, a trial and error approach, and a random approach.

2. The non-transitory computer-readable medium of claim 1, where re-configuring the repository comprises activating the first blocklet in the repository.

3. The non-transitory computer-readable medium of claim 1, where reconfiguring the index comprises moving information about the first blocklet into the index.

4. The non-transitory computer-readable medium of claim 1, where reconfiguring the index comprises activating information about the first blocklet in the index.

5. The non-transitory computer-readable medium of claim 1, comprising selecting the seed corpus from two or more available seed corpora.

6. The non-transitory computer-readable medium of claim 5, where the seed corpus is selected as a function of one or more of, a relationship between data to be ingested by the data de-duplication apparatus and the seed corpus, a historical performance measurement associated with the seed corpus, an on-the-fly performance measurement associated with the seed corpus, a user action, a calendar date, a day of the week, a time of day, a user identity, and an occurrence of a pre-defined event.

* * * * *

UNITED STATES PATENT AND TRADEMARK OFFICE
CERTIFICATE OF CORRECTION

PATENT NO.       : 8,892,526 B2
APPLICATION NO.  : 13/348031
DATED            : November 18, 2014
INVENTOR(S)      : Timothy Stoakes Page 1 of 1

It is certified that error appears in the above-identified patent and that said Letters Patent is hereby corrected as shown below:

In the Specification:

In column 14, line 32, delete "AAA, MB, AABB" and insert --AAA, AAB, AABB--.

Signed and Sealed this
Twenty-fourth Day of March, 2015

Michelle K. Lee
*Director of the United States Patent and Trademark Office*